(12) United States Patent
Ingram

(10) Patent No.: US 6,264,898 B1
(45) Date of Patent: *Jul. 24, 2001

(54) PULSED CORONA DISCHARGE APPARATUS

(75) Inventor: Michael W. Ingram, San Leandro, CA (US)

(73) Assignee: The Titan Corporation, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,725

(22) Filed: Nov. 19, 1997

(51) Int. Cl.⁷ .................. B01J 19/08; B01J 19/12

(52) U.S. Cl. .................. 422/186.21; 422/186.04; 422/186.28

(58) Field of Search .......... 204/164; 422/186.04, 422/186.21, 186.28; 363/50, 52, 53, 84

(56) References Cited

U.S. PATENT DOCUMENTS

| | | |
|---|---|---|
| 3,677,931 | 7/1972 | O'Hare . |
| 4,339,783 | 7/1982 | Kinashi et al. . |
| 4,872,959 | 10/1989 | Herbst et al. . |
| 4,886,645 | 12/1989 | Fischer et al. . |
| 4,960,569 | 10/1990 | Fovell et al. . |
| 5,236,672 | 8/1993 | Nunez et al. . |
| 5,490,973 | 2/1996 | Grothaus . |
| 5,545,380 | 8/1996 | Gray ........................ 422/186.07 |

FOREIGN PATENT DOCUMENTS

| | | |
|---|---|---|
| 0744802 | 11/1996 | (EP) . |
| 408091808 | * 4/1996 | (JP) . |

OTHER PUBLICATIONS

I.D. Chambers, L. Zanella, S.J. MacGregor and J.A. Wray "Ozone Generation by Pulsed Corona Discharge in a Wire Cylinder Arrangement" appearing in (1994) The Institution of Electrical Engineers, printed and published by the IEE, Savoy Place, London, WC28. U.K. No Month Avail.

Japanese Patent abstract of JP408091808A, Apr. 9, 1996.*

* cited by examiner

Primary Examiner—Kathyrn Gorgos
Assistant Examiner—Wesley A. Nicolas
(74) Attorney, Agent, or Firm—Gregory S. Rosenblatt; Jody Lynn DeStefanis; Wiggin & Dana

(57) ABSTRACT

An apparatus for remediating a contaminated fluent material, such as a gas, utilizes a pulsed corona discharge. The apparatus includes a reactor section and a power supply section. The reactor section has a plurality of first electrodes electrically interconnected to a header plate and a plurality of second electrodes concentrically disposed about each first electrode and electrically interconnected to a reactor plate. The electrical contact between the header plate and the power supply is by a compression spring. When fluent material is flowing within channels defined by the second electrodes and a high voltage pulse is applied to the header plate, a stream of high energy electrons flows between the first electrodes and the second electrodes forming corona discharges effective to destroy polluting compounds contained in the contaminated fluent material.

21 Claims, 4 Drawing Sheets

PULSED CORONA DISCHARGE APPARATUS

BACKGROUND OF THE INVENTION

1. Field of the Invention

This invention relates to a pulsed corona discharge apparatus to remediate a contaminated fluent material. More particularly, the fluent material is passed through a reactor vessel having a plurality of electrically interconnected wire electrodes each circumscribed by a second electrode. A high voltage pulse to the wire electrodes generates a streamer corona discharge that breaks down the contaminants in the fluent material to more innocuous constituents.

2. Background of the Invention

Fluent materials, typically gases, but also including liquids, are frequently contaminated with hazardous or odiferous materials, such as volatile organic compounds. Before discharging the fluent material to the environment, it is desirable, and may be legally mandated, that the hazardous compounds be remediated by removal or destruction. Methods to remediate hazardous compounds suspended within a fluent material include high temperature thermal incineration, catalytic incineration and absorption utilizing materials such as activated carbon. These methods tend to be expensive and have a low through-put.

Another approach is to break down the hazardous compounds into innocuous materials, such as water and carbon dioxide, by reacting the hazardous compounds with a stream of high energy electrons generated by a partial electrical breakdown of the fluent material. This method is disclosed in U.S. Pat. No. 5,236,672 to Nunez et al. and in U.S. Pat. No. 5,490,973 to Grothaus et al. Both the Nunez et al. and the Grothaus et al. patents are incorporated by reference in their entireties herein.

The Grothaus et al. patent discloses a reactor having a wire electrode that extends along a longitudinal axis of a tubular electrode circumscribing the wire electrode. Insulators at the entrance and exit of the tubular electrodes center the wire electrode along the axis of the tubular electrode, provide tension to the wire electrode to prevent sagging, electrically isolate the wire electrode from the tubular electrode, and provide a gas seal to prevent the flow of gas to parts of the reactor other than the tubular electrode. The insulators are baffled to allow for the ingress and egress of the fluent material and gases are introduced into each reactor tube separately. As a result, complicated gas seals are required, the through-put is low and the number of machine parts required is high.

In addition, the Grothaus et al. patent discloses a method of control of the high voltage power supply that does not detect improper high voltage discharges and so may lead to a failure to remediate the hazardous gas and to possible destruction of the reactor itself.

There remains a need for a pulsed corona discharge apparatus suitable to remediate a contaminated fluent material that does not have the disadvantages of the prior art discussed hereinabove.

SUMMARY OF THE INVENTION

Accordingly, it is an object of the invention to provide a reactor for remediating a contaminated fluent material with a pulsed corona discharge. Among the features of the invention are that there is a single common header plate electrically interconnected to a plurality of first electrodes and a common reactor plate electrically interconnected to a plurality of second electrodes with a second electrode concentrically disposed about each first electrode. Another feature of the invention is that the second electrodes are tubular and provide a plurality of channels to receive the contaminated fluent. A single inlet effectively communicates the contaminated fluent to all tubular electrodes and a single outlet effectively removes the remediated fluent. Still another feature of the invention is that intermittent high voltage pulses are applied to the header plate by a power supply and distributed to the plurality of first electrodes.

Among the advantages of the invention are that the reactor has a simplified design requiring a limited number of machine parts. A further advantage is that the power supply is readily separated from the reactor to facilitate part replacement and cleaning of the reactor. Another advantage of the invention is that electrical power is controlled in such a way that improper high voltage discharges will be detected and corrected. Yet another advantage of the invention is that the pulsed corona discharge effectively remediates contaminated fluent material.

In accordance with the invention, there is provided a system for remediating a contaminated fluent. The system includes a power supply capable of providing intermittent pulses of high voltage to an electrically conductive header plate. A plurality of first electrodes are electrically interconnected to that header plate. A plurality of second electrodes, each of which is concentrically disposed about one of the first electrodes defines a plurality of channels to contain the contaminated fluent. An electrically grounded reactor plate is electrically interconnected to each of the plurality of second electrodes and electrically isolated from both the header plate and the plurality of first electrodes. An inlet introduces the contaminated fluent to each of the channels and an outlet recovers the remediated fluent.

The above stated objects, features and advantages will become more apparent from the specification and drawings that follow:

IN THE DRAWINGS

DETAILED DESCRIPTION

Figure 1:
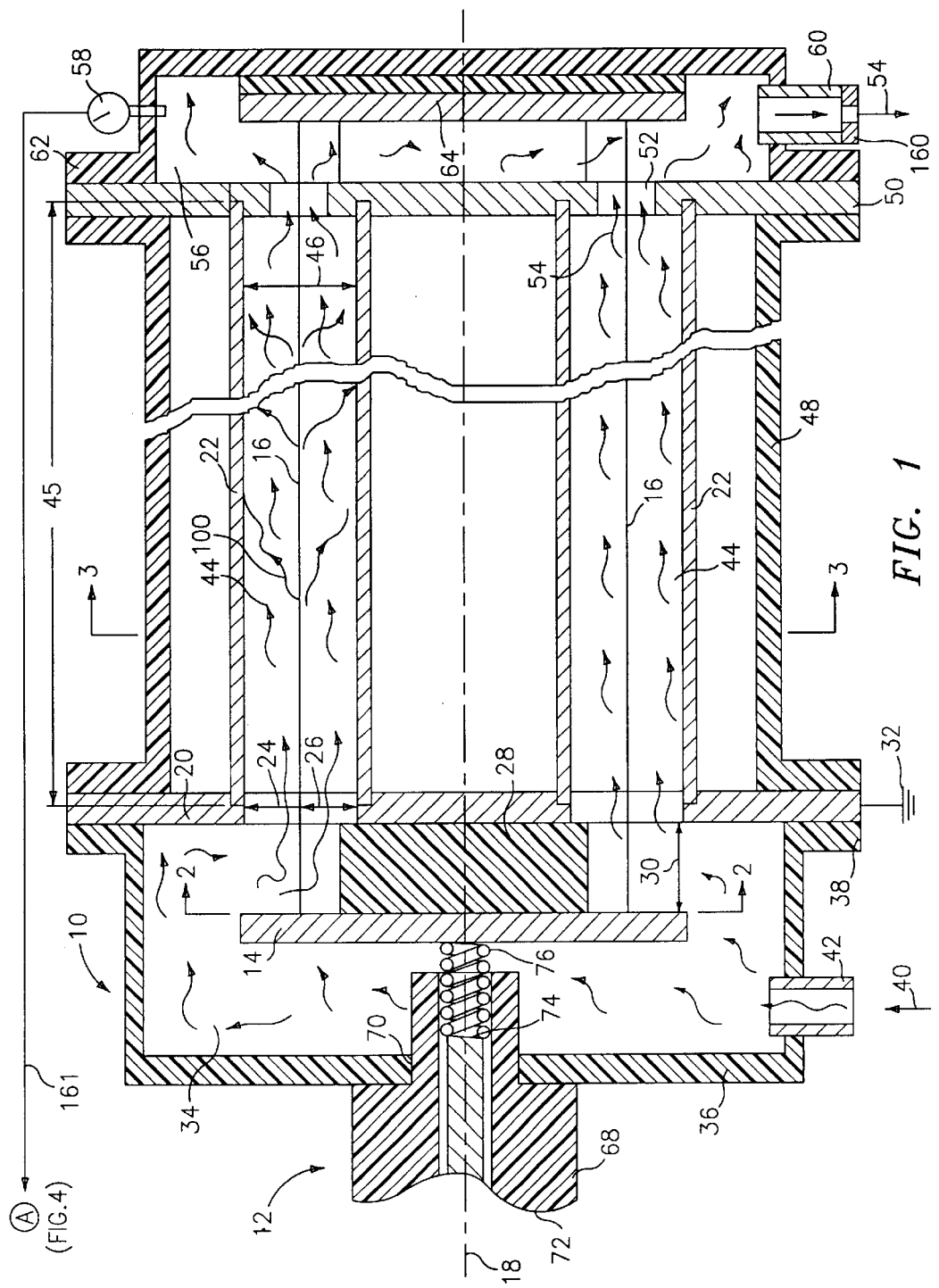
FIG. 1 illustrates in longitudinal cross-sectional representation the reactor portion of the system of the invention.
Figure 4:
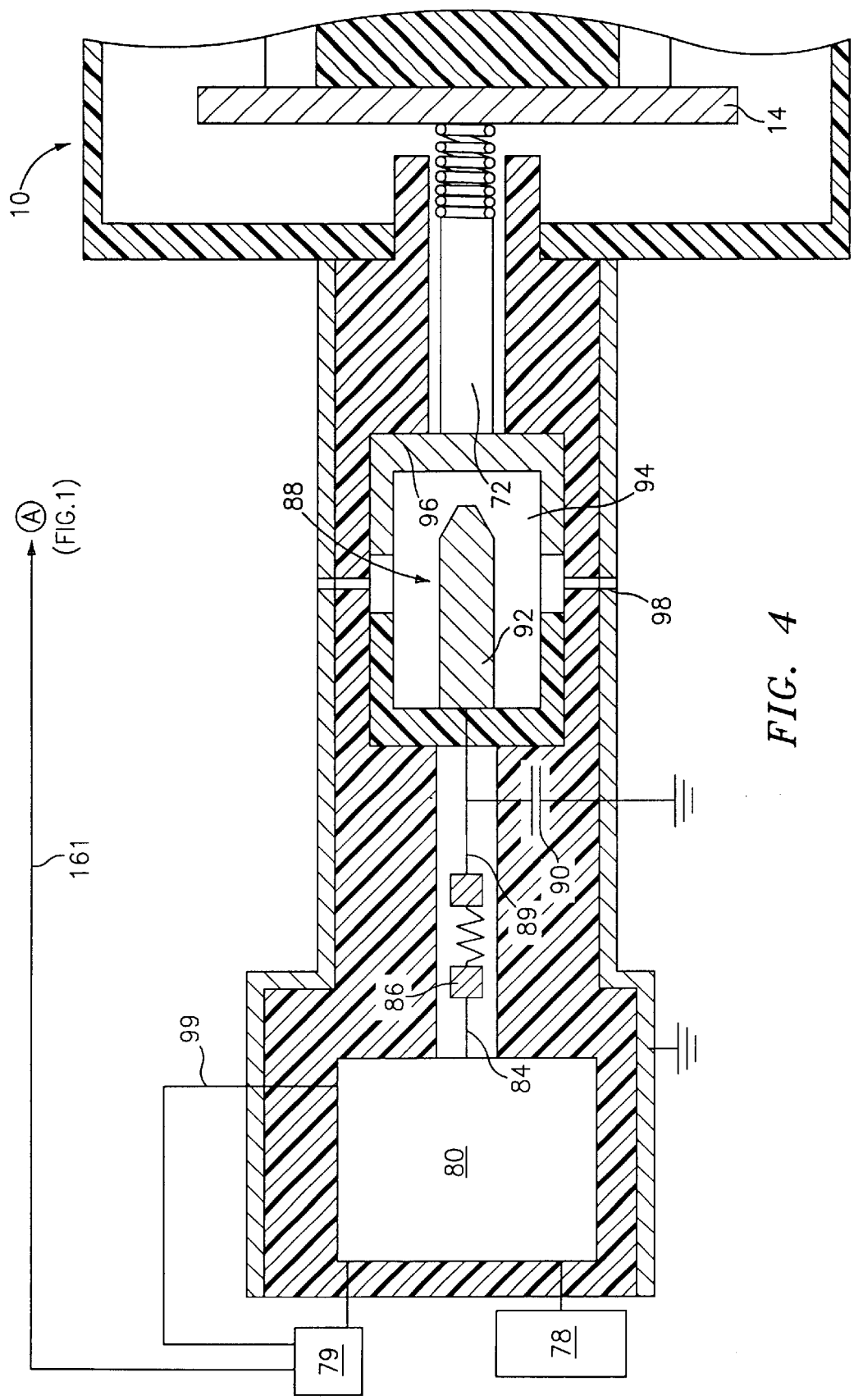
FIG. 4 illustrates in longitudinal cross-sectional representation the power supply portion of the system of the invention.

A system for treating a contaminated fluent in accordance with the invention has two sections, a reactor section 10 that treats a contaminated fluent and a power supply section 12 that provides intermittent pulses of high voltage electric power to the reactor section. The reactor section 10 is illustrated in FIG. 1. A portion of the power supply section 12 is illustrated in FIG. 1. The entire power supply section 12 is illustrated in FIG. 4.

FIG. 1 illustrates the reactor section 10 in cross-sectional representation. The reactor section 10 includes an electrically conductive header plate 14 that is preferably formed from an electrically conductive metal such as stainless steel.

A plurality of first electrodes 16 are electrically interconnected to the header plate 14. Electrical interconnection is by any means effective to support the first electrode 16 under tension and includes bolting, welding, soldering and brazing. High voltages will be transferred from the header plate 14 to the first electrodes 16 through the electrical interconnection, so low electrical resistance attachment means are preferred. A most preferred attachment means is bolting, that has the additional advantage that the first electrodes 16 may be readily replaced.

The first electrodes 16 are of any desired shape and formed from any suitable electrically conductive material. Preferred materials for the first electrodes include stainless steel. A preferred shape for the first electrode is a wire having a generally circular cross-section with a diameter of from about 0.001 inch to about 0.1 inch. More preferably, the diameter of the first electrodes is from about 0.01 inch to about 0.05 inch.

Figure 2:
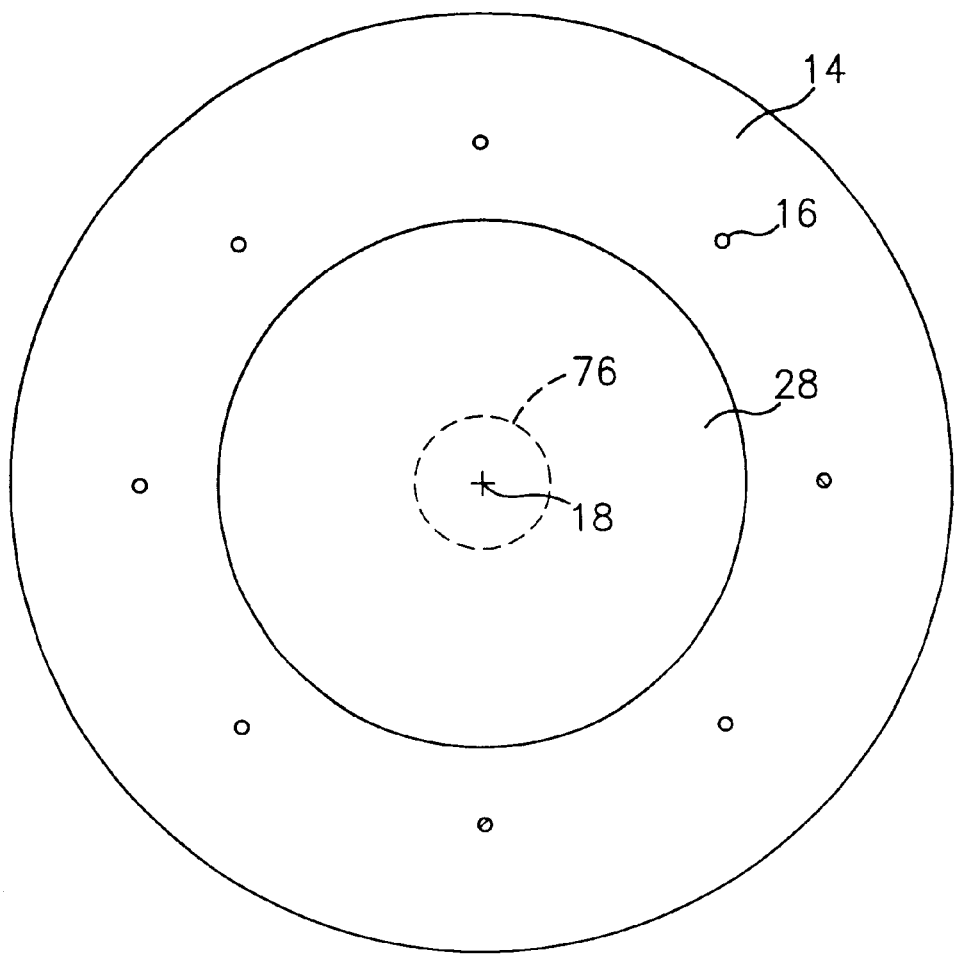
FIG. 2 illustrates in transverse cross-sectional representation the header plate of the invention.

FIG. 2 is a cross-sectional view of the reactor system illustrated in FIG. 1 viewed along section line 2—2. FIG. 2 shows that the first electrodes 16 are disposed about the header plate 14. Preferably, a plurality of first electrodes 16 are symmetrically oriented about a longitudinal axis 18 of the reactor section. While FIG. 2 illustrates eight first electrodes, any number amenable with a respective reactor design may be utilized. Preferred systems are believed to include from one to twenty first electrodes.

Referring back to FIG. 1, an electrically conductive reactor plate 20 is spaced from and electrically isolated from the header plate 14. The reactor plate 20 is formed from an electrically conductive metal, preferably stainless steel. The reactor plate is sufficiently strong to support a plurality of second electrodes 22. Typically, the reactor plate has the thickness of from about 0.125 inch to about 1.5 inches and more preferably, the thickness from about 0.5 inch to about one inch.

Electrical isolation between the header plate 14 and the reactor plate 20 is provided by the fluent material around the periphery of the header plate 14 and at first apertures 24 that extend through the reactor plate 20. The first apertures 24 facilitate entrance of the first electrodes 16 into the bore of tubular second electrodes 22. Preferably, the second electrodes 22 are concentrically disposed around the first electrodes 16.

High voltage pulses applied to the header plate drive electric discharges between the first electrodes 16 and the second electrodes 22, with the discharge completely contained within the volume of the tubular electrode 22. To ensure the discharge is created only within the volume enclosed by the second electrodes 22, the minimum distance 26 between the first electrode 16 and the reactor plate 20 should be at least equal to the distance between the first electrode 16 and the second electrode 22. Additionally, the first apertures 24 should be shaped such that the electric field in the region of the first apertures 24 does not exceed the electric field found between the first electrode 16 and the second electrodes 22.

Further electrical isolation between the header plate 14 and the reactor plate 20 is provided by a centrally disposed dielectric material 28. The dielectric material 28 is bonded to both the reactor plate 20 and to the header plate 14 and maintains the two components a fixed distance apart. The dielectric 28 is any suitable electrically non-conductive material having a breakdown voltage greater than the voltage applied by the power supply section 12. Suitable materials for the dielectric 28 include ceramics and polymers. Polymers are preferred since attachment of the dielectric 28 to both the reactor plate 20 and the header plate 14 is preferably by a mechanical means such as through the use of screws and the machinability of a polymer is an advantage. A preferred polymer is polytetrafluoroethylene (TEFLON, a trademark of DuPont, Wilmington, Del.).

As illustrated in FIG. 2, the dielectric 28 is centrally disposed relative to the first electrodes 16 whereby the first electrodes 16 are unimpeded by the dielectric 28. The diameter of the dielectric 28 should be sufficiently large to prevent tension variation between respective first electrodes 16 from shifting the header plate 14 to a non-parallel orientation relative to the reactor plate 20. Preferably, the diameter of the dielectric 28 is at least 40% of the diameter of the header plate 14. For example, if the header plate 14 is a circle with a diameter of 6.25 inches, then the dielectric has a diameter of about 2.50 inches.

The thickness of the dielectric 28 is that effective to prevent electric arcing between the header plate 14 and the reactor plate 20 and, with reference back to FIG. 1, the distance 30 is from about 0.25 inch to about 2 inches and more preferably from about one inch to about two inches.

The dielectric 28 also serves to locate the header plate 14 in a fixed position relative to the reactor plate 20 such that each first electrode is located concentrically relative to the second electrode through which that first electrode passes.

A pulsed corona discharge is formed extending between the first electrodes 16 and the second electrodes 22. The voltage potential electrically required to establish the discharge between the first electrode 16 and second electrode 22 is formed by raising the first electrodes 16 to sufficiently high voltage to form the discharge and by having the reactor plate 20, and electrically interconnected second electrodes 22, at ground potential 32. The high voltage may be either positive or negative relative to the grounded component.

Connected to the reactor plate 20, and circumscribing the reactor plate 20 and header plate 14 to form a gas receiving cavity 34, is gas manifold 36. The gas manifold 36 is hermetically sealed to the reactor plate 20, such as by flange 38 that is bolted, welded, brazed or otherwise joined to the reactor plate 20. Preferably, a compliant O-ring (not shown) may be disposed between the flange 38 and the reactor plate 20. When a contaminated fluent 40 is delivered to the gas receiving cavity 34 through inlet 42, the contaminated fluent 40 fills the gas receiving chamber 34 and flows down a plurality of channels 44 formed by second electrodes 20. The combination of the gas manifold 36 and reactor plate 20 containing first apertures 24 results in the inlet 42 effectively providing contaminated fluent 40 to each reaction chamber defined by the combination of a second electrode 22 and first electrode 16. It is not necessary to provide a separate gas inlet to each reaction chamber and separate baffling to each channel 44 is not required.

The gas manifold 36 is formed from any suitable material. To minimize electric shock hazard, the gas manifold 36 is preferably formed from an electrically conductive material such as stainless steel.

The second electrodes 22 are electrically interconnected to the reactor plate 20 and extend in a direction away from the header plate 14 for an extended distance. The length of the second electrodes 22 define the reaction chamber length and the time during which contaminated fluent is in contact with the corona discharge and subject to remediation. Typically, the length 44 of the second electrodes 22 is from about six inches to about 60 inches.

The second electrodes are typically tubular with an inside diameter 46 of from about 0.5 inch to about 3 inches.

Figure 3:
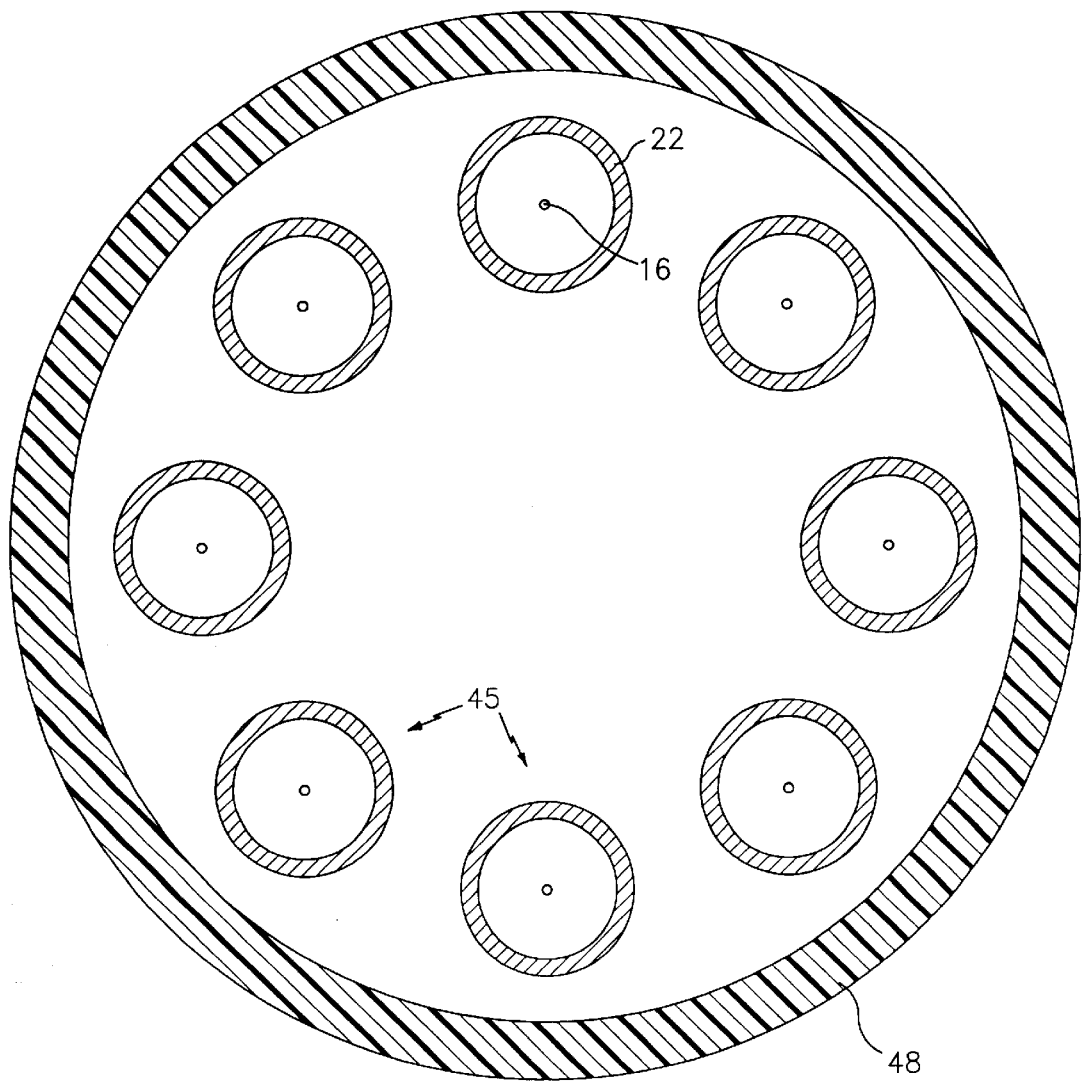
FIG. 3 illustrates in transverse cross-sectional representation a plurality of second electrodes circumscribing the first electrodes in accordance with the invention.

FIG. 3 is a cross-sectional representation of the reactor section 10 viewed along section line 3—3 and illustrates a plurality of reaction chambers comprising the combination of a second electrode 22 and first electrode 16 extending within the reactor housing 48. The volume of reaction chamber effective to remediate contaminated fluent is the product of the number of reaction chambers multiplied by the length of each chamber times the cross-sectional area of each chamber. For a reactor having eight reaction chambers, each with a length of 36 inches and an inner diameter of one inch, the total effective volume is 226 cubic inches.

The second electrodes 22 are formed from a suitable electrically conductive material that resists deformation and erosion from contact with an electric discharge and heating due to a pulsed corona discharge. One suitable material for the second electrode 22 is stainless steel. A suitable wall thickness for the second electrode is from about 0.05 inch to about 0.2 inch.

Referring back to FIG. 1, the second electrodes 22 terminate at a down stream reactor plate 50 that is preferably formed from an electrically conductive material and more preferably from the same material as the reactor plate 20. Second apertures 52 extend through downstream reactor plate 50 and discharge remediated fluent 54 from the reaction chambers. The second apertures 50 preferably have a size and shape that is similar to the first apertures.

The remediated fluent 54 may be discharged directly to the atmosphere, or preferably, is contained within a gas discharge cavity 56 where a sensor 58 determines the level of volatile organic compounds or other hazardous materials. If the hazardous material content is sufficiently low, the remediated fluent 54 is discharged through outlet 60. If the hazardous material content is too high, a restrictor 160 is partially closed so that the flow rate of the fluent material through the reactor is slowed and the remediation level is thereby increased.

Alternatively, and preferably, the sensor 58 is in a feedback loop 161 with the power supply control unit (79 in FIG. 4) so that the electrical power delivered to the reactor is adjusted automatically to respond to variations in the exhaust fluent pollutant concentration. If the remediated fluent 54 pollutant concentration increases, the sensor 58 causes the power supply control unit to increase the electrical power to the reactor. As the exhaust concentration then stabilizes at a value predetermined and programmed into the power supply control unit by an operator, the sensor 58 causes the control unit to reduce the electrical power to the reactor. The electrical power delivered to the reactor may be controlled by adjusting the voltage delivered to the header plate or, preferably, by adjusting the pulse repetition rate. The power delivered to the reactor is roughly proportional to the voltage squared times the repetition rate. This automatic feedback and control of the exhaust concentration is advantageous in ensuring efficient operation of the system during periods of fluctuating inlet pollutant concentration.

The gas discharge cavity 56 is bordered by the downstream reactor plate 50 and an end cap 62 that is hermetically sealed to the downstream reactor plate 50 and provides sufficient room for the gas discharge cavity 56 as well as a tension plate 64. Preferably, the end cap 62 is formed from an electrically non-conductive material to prevent unintentional contact with the electrodes that may be at a high voltage potential. The end cap 62 may also be formed from an electrically conductive material to provide shielding of the high voltage components.

The tension plate 64 supports the first electrode 16 and in cooperation with header plate 14 maintains the first electrodes under tension and substantially parallel to the longitudinal axis 18 and centered within each of the second electrodes 22. Preferably, the tension plate 64 is formed from an electrically conductive material such as stainless steel.

The tension plate 64 may be supported by the downstream reactor plate 50 utilizing a dielectric substantially similar to the dielectric 28 or, alternatively, as illustrated in FIG. 1, bonded to the end cap 62 by a polymer adhesive 66, or mechanical means such as bolts or screws.

An opening in the gas manifold 36 receives an interconnect portion 68 of the power supply portion 12. An interface 70 between the power supply section 12 and the reactor section 10 is hermetic, such as by insertion of an o-ring, gasket or other suitable means. Preferably, the power supply section 12 is permanently attached to the manifold 36 so that the power supply section may be disconnected from the reactor section 10 at the flange 38 and reactor plate 20 interfaces, facilitating replacement of parts and interchangability of components.

Alternatively, the interface 70 is such that the interconnect portion 68 is readily removed to separate the power supply section 12 from the reactor section 10. Centrally disposed within the interconnect portion 68 is a power supply electrode 72. The power supply electrode is any electrically conductive material, such as a copper alloy or stainless steel. The interconnect portion 68 is electrically insulating.

A front portion 74 of the power supply electrode 72 applies a compressive force on a detachable contact, such as leaf spring or compression spring 76. The compression spring 76 is formed from an electrically conductive material such as stainless steel and also contacts the header plate 14 to form a low resistance electrical contact between the power supply electrode 72 of the power supply section 12 and the header plate 14. Since the compression spring 76 is not mechanically or chemically bonded to the header plate 14, separation of the power supply section from the reactor section is facilitated and alignment of the two is not critical. As best illustrated in FIG. 2, the compression spring 76 typically contacts a centrally disposed portion of the header plate 14 to provide electrical energy to each of the first electrodes 16.

The power supply portion 12 is illustrated in cross sectional representation in FIG. 4. An alternating current (AC) power source 78 (such as 120 volt, 60 cycles per second) delivers an alternating current to a power supply 80 that converts the low voltage AC to high voltage direct current (DC).

The DC power supply 80, converts the alternating current from the AC power source 78 to a direct current output voltage 84 that is in excess of 10 kilovolts, and preferably is between about 30 kilovolts and about 40 kilovolts. The output voltage 84 is conducted to isolation impedance 86 that is in series with the DC power supply 80. The isolation impedance is a resistor that has a resistance of at least 20 ohms and the resistance is preferably about 100 ohms. The isolation impedance electrically isolates the power supply 78 from a high speed switch 88.

The output current 89 is conducted from the isolation resistor 86 to a capacitor 90 then to ground. The capacitor 90 stores electrical energy of at least 0.05 joule, and preferably approximately 1 joule is contained. The high speed switch 88 then closes connecting the capacitor 90 to the header plate 14 via the power supply electrode 72 conducting a voltage pulse of between about 10 kilovolts and 200 kilovolts.

One exemplary high speed switch is disclosed in commonly owned U.S. Pat. application Ser. No. 08/971882

(issued as U.S. Pat. No. 6,037,715 (U.S. Pat. No. '715)) entitled "Spark Switch having Coaxial Electrode with Increased Electrode Surface Area Exposure" filed on Nov. 19, 1997 by Hammon, et al., and incorporated by reference in its entirety herein.

More specifically, U.S. Pat. No. '715 discloses a spark switch wherein the surface area of the exposed electrodes is significantly increased by having an inner electrode nested in, or surrounded by, an outer electrode. This nested configuration enables the exposed electrode surface area of inner electrode and outer electrode to have up to approximately five times the exposed surface area of conventional axial-spark switches of the same over-all volume.

The spark gap switch of U.S. Pat. No. '715 has a first end plate and a second end plate, an inner electrode having an outer wall, and an outer electrode. Both the inner electrode and outer electrode are disposed between the first and second end plates and bonded thereto. The outer electrode defines a cavity for receiving a portion of the inner electrode, and the outer wall of the inner electrode and the cavity of the outer electrode form a radial gap. An insulating material is disposed in a sleeve-like configuration around the outer electrode. The insulating material is protected against exposure to contaminants during switching because the outer electrode acts as a barrier to switching byproducts.

U.S. Pat. No. '715 also teaches a coaxial switch with electrodes connected to electrical connectors. An insulating material is at either end of the coaxial switch and there are means to maintain the position of the insulating material. This embodiment has a conducting tube connected to an electrical source and an electrical load to provide a path for return current from the load to the source.

Another embodiment of U.S. Pat. No. '715 is directed to a third electrode nested within the inner electrode and thereby forming an additional radial gap. Yet another embodiment of U.S. Pat. No. '715 is directed to a switch having inlet and outlet ports so that accumulated debris may be removed.

These switches have enhanced operational life because the amount of exposed electrode surface area is increased over conventional switches. The voltage on the capacitor 90 energizes a first electrode 92 of the spark gap switch 88. When the voltage charge applied to the first electrode 92 exceeds the breakdown voltage of a gas 94 contained within spark gap switch 88, an arc connects the first electrode 92 to the spark gap second electrode 96 energizing the power supply electrode 72.

The spark gap 94 is filled with any suitable gas, including air. Hydrogen is preferred since the voltage recovery characteristics of hydrogen allows high pulse repetition rates.

The high speed switch delivers voltage pulses on the order of from about 5 nanoseconds to about 1 microsecond with the interval between pulses being in the range of from about 100 microseconds to about one second.

A feedback loop 99 between the DC power supply 80 and the control unit 79 indicates when a discharge has occurred in the output circuit of the DC power supply. This discharge may be the desired discharge in the reactor section 10 or it may be an undesired discharge anywhere else in the high voltage circuit. On receipt of a signal from the feedback loop 99, the control unit 79 prevents further charging of capacitor 90 by DC power supply 80. When the desired interval between pulses has elapsed, the control unit 79 allows the DC power supply to begin charging the capacitor 90 for another cycle.

Synchronization provided by feedback loop 99 is desired so the DC power supply 80 is completely isolated from the capacitor 90 immediately following closure of the high speed switch 88. Otherwise, the DC power supply would deliver energy directly to the reactor section 10 in an inefficient manner.

Referring back to FIG. 1, when the power supply electrode 72 applies a voltage pulse to the header plate 14, each of the first electrodes 16 are brought to that same voltage potential. When the voltage potential exceeds the breakdown voltage of the fluent material, a stream of electrons 100 flows between the first electrode 16 and the second electrode 22 in the form of a high energy corona. As the contaminated fluent 44 passes through the energized electrons 100, collisions between the fluent material and the electrons create highly reactive species called radicals. These radicals, in turn, react with and destroy the pollutant species breaking them down into more innocuous materials such as $O_2$, $N_2$, $CO_2$ and $H_2O$.

Referring back to FIG. 4, if the voltage is applied to the first electrodes for an excessively long period of time, the process efficiency is reduced due to acceleration of ionic species in the fluent gas. This will ultimately result in a thermal arc with attendant energy inefficiency, reduced treatment volume and electrode damage. Therefore, the high voltage pulse is kept short by the particular design of the power supply section 12.

While the power supply section 12 has been described in combination with the reaction section 10 of the pulsed corona discharge apparatus of the invention, the power supply section has utility for any application that requires short duration pulses of high voltage electricity.

It is apparent that there has been provided in accordance with the present invention a pulsed corona discharge apparatus that fully satisfies the objects, means and advantages set forth hereinabove. While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A reactor for generating a pulsed corona discharge to treat a contaminated fluent, said reactor having a power supply section and a reaction section that comprise:

said power supply section being capable of providing intermittent pulses of voltage between about 30 kilovolts and about 100 kilovolts to an electrically conductive header plate of said reactor section wherein electrical contact between said header plate and said power supply section is by a compression spring disposed between said header plate and said power supply section; and said reactor section includes said electrically conductive header plate, a plurality of first electrodes electrically interconnected to said header plate;

a plurality of second electrodes, each of said second electrodes being concentrically disposed about one of said first electrodes to define a plurality of reaction chambers to receive contaminated fluent;

an electrically conductive reactor plate electrically interconnected to said plurality of second electrodes and electrically isolated from both said header plate and said plurality of first electrodes;

a manifold circumscribing said header plate and said reactor plate forming a gas receiving cavity;

an inlet for delivering contaminated fluent to said gas receiving cavity; and an outlet to recover remediated fluent from downstream ends of said plurality of second electrodes; and wherein said reactor includes:

a connection from a supply of alternating current to a high voltage power supply unit that converts said alternating current to a direct current voltage;

a control unit controlling said high voltage power supply unit;

a feedback loop between output of said high voltage power supply unit and said control unit to cause said output to terminate upon any sudden decrease in said high voltage output;

wherein said power supply section includes an isolation impedance connected between said high voltage power supply unit and a high speed switch;

a first conductor;

a second conductor;

inner and outer electrodes disposed between said first conductor and said second conductor;

the inner electrode comprises:

a proximal end;

a terminal end opposite said proximal end; and an outer wall; and the outer electrode comprises:

a proximal end;

a terminal end opposite said proximal end;

said outer electrode defines a cavity for receiving at least a portion of the inner electrode, and the outer wall of the inner electrode and the cavity of the outer electrode from a radial gap; and a terminal gap between proximal end of the outer electrode and the terminal end of the inner electrode, the radial gap, and the terminal gap being pressurized with a dielectric gas.

2. The reactor of claim 1 wherein said plurality of first electrodes are each under tension applied by a combination of said header plate and a tension plate, said plurality of second electrodes being disposed between said header plate and said tension plate.

3. The reactor of claim 2 wherein said plurality of first electrodes are wires with a diameter of from about 0.001 inch to about 0.1 inch.

4. The reactor of claim 3 wherein said plurality of second electrodes are tubular and have an inside diameter of from about 0.5 inch to about three inches.

5. The reactor of claim 1 wherein said intermittent pulses are at a voltage of between about 30 kilovolts and about 40 kilovolts.

6. The reactor of claim 5 wherein electrical contact between said header plate and said power supply section is by a detachable contact.

7. The reactor of claim 6 wherein said dielectric is a polymer having a thickness of from about 0.25 inch to about two inches.

8. The reactor of claim 1 further comprising:

a capacitor connected at the junction of said isolation resistor and said high speed switch for receiving energy from said high voltage power supply; and said high speed switch electrically interconnecting said capacitor and said header plate when discharging and electrically isolating said capacitor from said header plate at other times.

9. The reactor of claim 8 wherein said isolation impedance has an impedance effective to electrically isolate said high voltage power supply from said high speed switch.

10. The reactor of claim 9 wherein said impedance is a resistor with a resistance in excess of about 20 ohms.

11. The reactor of claim 9 wherein said capacitor discharges at an energy charge in excess of about 0.05 joule.

12. The reactor system of claim 8 further including a feedback loop between said control unit and a sensor coupled to said remediated fluent that determines a level of hazardous compounds in said remediated fluent.

13. The reactor of claim 12 wherein said feedback loop is in communicating relationship with a restrictor to adjust the flow rate of said remediated fluent thereby regulating a time for treatment of said contaminated fluent.

14. The reactor of claim 12 wherein said feedback loop is in communicating relationship with said control unit to adjust power provided by said intermittent pulses of high voltage.

15. The reactor of claim 13 wherein said feedback loop is also in communicating relationship with said control unit to adjust power provided by said intermittent pulses of high voltage.

16. The reactor system of claim 1 wherein said gas is hydrogen.

17. The reactor system of claim 16 wherein said spark gap switch provides an interval between pulses of from about 100 microseconds to about one second.

18. The reactor of claim 1 further comprising a dielectric disposed between and bonded to both said header plate and to said reactor plate creating an electrical isolation between said electrically conductive header plate and said reactor plate.

19. The reactor of claim 18, wherein said dielectric has an area of at least 40% of the area of said header plate.

20. A reactor for generating a pulsed corona discharge to treat a contaminated fluent, said reactor having a power supply section and a reactor section that comprise:

said power supply section being capable of providing intermittent pulses of high voltage between about 30 kilovolts and about 100 kilovolts to an electrically conductive header plate of said reactor section wherein electrical contact between said header plate and said power supply section is by a compression spring disposed between said header plate and said power supply section; and said reactor section includes said electrically conductive header plate;

a plurality of first electrodes electrically interconnected to said header plate;

a plurality of second electrodes, each of said second electrodes being concentrically disposed about one of said first electrodes to define a plurality of reaction chambers to receive contaminated fluent, an electrically conductive reactor plate electrically interconnected to said plurality of second electrodes and electrically isolated from both said header plate and said plurality of first electrodes;

a manifold circumscribing said header plate and said reactor plate forming a gas receiving cavity;

an inlet for delivering contaminated fluent to said gas receiving cavity; and an outlet to recover remediated fluent from downstream ends of said plurality of second electrodes; and wherein said reactor includes:

a connection from a supply of alternating current to a high voltage power supply unit that converts said alternating current to a direct current voltage;

a control unit controlling said high voltage power supply unit;

a feedback loop between output of said high voltaage power supply unit and said control unit to cause said output to terminate upon any sudden decrease in said high voltage output;

wherein said power support section includes an isolation impedance connected between said high voltage power supply unit and a high speed switch;

wherein said high speed switch is comprised of:
an inner electrode;
an outer electrode having a cavity for receiving at least a portion of the inner electrode in a mating fashion, whereby a radial gap is formed between the inner electrode and outer electrode;
a conducting tube surrounding the inner and outer electrodes the conducting tube electrically insulated from the inner and outer electrodes;
a first coaxial connector for coupling one of the electrodes to an electrical load; and
a second coaxial connector for coupling the other electrode to an electrical source.

21. A reactor for generating a pulsed corona discharge to treat a contaminated fluent, said reactor having a power supply section and a reactor section that comprise:

said power supply section being capable of providing intermittent pulses of high voltage between about 30 kilovolts and about 100 kilovolts to an electrically conductive header plate of said reactor section wherein electrical contact between said header plate and said power supply section is by a compression spring disposed between said header plate and said power supply section; and said reactor section includes said electrically conductive header plate;
a plurality of first electrodes electrically interconnected to said header plate;
a plurality of second electrodes, each of said second electrodes being concentrically disposed about one of said first electrodes to define a plurality of reaction chambers to receive contaminated fluent,
an electrically conductive reactor plate eclectically interconnected to said plurality of second electrodes and electrically isolated from both said heater plate and said plurality of first electrodes;
a manifold circumscribing said heater plate and said reactor plate forming a gas receiving cavity;
an inlet for delivering contaminated fluent to said gas receiving cavity; and
an outlet to recover remediated fluent from downstream end of said plurality of second electrodes; and wherein said reactor includes:
a connection from a supply of alternating current to a high voltage power supply unit that converts said alternating current to a direct current voltage;
a control unit controlling said high voltage power supply unit; a feedback loop between output of said high voltage power supply unit and said control unit to cause said output to terminate upon any sudden decrease in said high voltage output;

wherein said power supply section includes an isolation impedance connected between said high voltage power supply unit and a high speed switch;

wherein said high speed switch is comprised of:
an inner electrode;
an outer electrode having a cavity for receiving at least a portion of the inner electrode in a mating fashion, whereby a radial gap is formed between the inner electrode and outer electrode;
a conducting tube surrounding the inner and outer electrodes;
a first insulating material disposed around a portion of the inner electrode between the inner electrode and the conducting tube whereby the inner electrode is insulated from the connecting tube;
a second insulating material disposed around a portion of the outer electrode between the outer electrode and the conducting tube whereby the outer electrode is insulated from the conducting tube;
a first coaxial connector for coupling one of the electrodes to an electrical load; and
a second coaxial connector for coupling the other electrode to an electrical source.

* * * * *